United States Patent
Einhorn

(10) Patent No.: US 10,207,587 B2
(45) Date of Patent: Feb. 19, 2019

(54) PRE-CHARGING SWITCH ARRANGEMENT, POWER SUPPLYING ARRANGEMENT AND METHOD FOR CONNECTING A LOAD TO A HIGH DIRECT-CURRENT VOLTAGE SOURCE

(71) Applicant: TE Connectivity Germany GmbH, Bensheim (DE)

(72) Inventor: Jorg Einhorn, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 198 days.

(21) Appl. No.: 15/248,718

(22) Filed: Aug. 26, 2016

(65) Prior Publication Data
US 2016/0362004 A1    Dec. 15, 2016

Related U.S. Application Data

(63) Continuation of application No. PCT/EP2015/054039, filed on Feb. 26, 2015.

(30) Foreign Application Priority Data

Feb. 28, 2014  (DE) .................. 10 2014 203 779
Apr. 7, 2014   (DE) .................. 10 2014 206 694

(51) Int. Cl.
*H01M 10/44* (2006.01)
*H01M 10/46* (2006.01)
(Continued)

(52) U.S. Cl.
CPC ........... *B60L 3/0046* (2013.01); *B60L 3/0069* (2013.01); *B60L 3/04* (2013.01); *B60L 11/1803* (2013.01); *B60L 11/1809* (2013.01); *H02J 7/0052* (2013.01); *H02M 1/36* (2013.01); *B60L 2210/10* (2013.01); *B60L 2210/40* (2013.01);
(Continued)

(58) Field of Classification Search
CPC .... H02J 7/04; H02J 7/044; H02J 7/045; H02J 7/1469
USPC ....... 320/104, 107, 128, 135, 138, 140, 166, 320/167
See application file for complete search history.

(56) References Cited

U.S. PATENT DOCUMENTS 8,432,058 B2    4/2013  Matsukawa et al.
2011/0234177 A1*  9/2011  Kohara .................. H02M 1/36
                                              320/166
(Continued)

FOREIGN PATENT DOCUMENTS

EP    2822132 A1    1/2015
JP    H03-98422 A   4/1991
(Continued)

OTHER PUBLICATIONS

Translation of JP 2005-102471 (Apr. 14, 2005).*
(Continued)

*Primary Examiner* — Edward Tso
(74) *Attorney, Agent, or Firm* — Barley Snyder

(57) ABSTRACT

A pre-charging switch arrangement for charging a capacitor of a direct-current circuit is disclosed. The pre-charging switch arrangement has a pre-charging resistor, a pre-charging switch, and a voltage detection device connected to the pre-charging resistor and detecting a voltage across the pre-charging resistor.

18 Claims, 2 Drawing Sheets

(51) Int. Cl.
*B60L 3/00* (2006.01)
*H02M 1/36* (2007.01)
*B60L 3/04* (2006.01)
*B60L 11/18* (2006.01)
*H02J 7/00* (2006.01)
*H02J 7/34* (2006.01)

(52) U.S. Cl.
CPC ........... *B60L 2270/20* (2013.01); *H02J 7/345* (2013.01); *Y02T 10/7005* (2013.01); *Y02T 10/7241* (2013.01)

(56) References Cited

U.S. PATENT DOCUMENTS

| | | | | |
|---|---|---|---|---|
| 2013/0106320 A1* | 5/2013 | Yugo | ........................ | H02P 7/00 318/139 |
| 2015/0256112 A1* | 9/2015 | Weiss | ........................ | H02H 7/09 318/51 |

FOREIGN PATENT DOCUMENTS

| | | |
|---|---|---|
| JP | H04-084774 A | 3/1992 |
| JP | 2008-193846 A | 8/2008 |
| JP | 2010-179889 A | 8/2010 |
| JP | 2005102471 A | 4/2014 |
| WO | 2013128700 A1 | 9/2013 |

OTHER PUBLICATIONS

PCT Notification of Transmittal of the International Search Report and the Written Opinion, International Search Report and Written Opinion of the International Searching Authority, dated Jun. 19, 2016, 10 pages.
English translation of JP2005102471A, dated Apr. 14, 2014, 12 pages.
European Communication, European Patent Application No. 15 711 436A, dated Oct. 15, 2018, 6 pages.
Japanese Notice of Reasons for Refusal with English translation, dated Oct. 30, 2018, 16 pages.
Abstract of JPH03-98422A, dated Apr. 24, 1991, 1 page.
Abstract of Jp H04-084774A, dated Mar. 18, 1992, 1 page.

* cited by examiner

PRE-CHARGING SWITCH ARRANGEMENT, POWER SUPPLYING ARRANGEMENT AND METHOD FOR CONNECTING A LOAD TO A HIGH DIRECT-CURRENT VOLTAGE SOURCE

CROSS-REFERENCE TO RELATED APPLICATIONS

This application is a continuation of PCT International Application No. PCT/EP2015/054039, filed Feb. 26, 2015, which claims priority under 35 U.S.C. § 119 to German Patent Application No. 102014206694.8, filed Apr. 7, 2014, and German Patent Application No. 102014203779.4, filed Feb. 28, 2014.

FIELD OF THE INVENTION

The present invention relates to a switch arrangement, and more particularly, to a pre-charging switch arrangement for charging a capacitor of a direct-current circuit having a high voltage source.

BACKGROUND

Pre-charging switch arrangements for direct-current circuits are used in particular in high-voltage direct-current circuits in which a load, such as a capacitor, is intended to be connected to a power source. A frequent application involves, for example, Battery Disconnecting Units (BDU) in electric or hybrid drives of vehicles. Such drives generally have high-voltage batteries which are connected to an inverter for providing the required alternating-current or three-phase current voltage to a vehicle drive unit. For reasons of safety, such devices have two controllable switches, one for each pole. These switches may, for example, be contactors or relays.

If the high direct-current voltage source is connected directly to the uncharged capacitor, short-circuit currents may briefly flow and may lead to damage to the components. Consequently, the capacitor is commonly pre-charged before it is completely connected to the direct-current voltage source. A pre-charging switch arrangement is connected parallel with one of the two controllable switches. In order to pre-charge the capacitor, the other controllable switch and a pre-charging switch are then closed. The capacitor is thereby charged by means of a pre-charging resistor. If the capacitor has reached a desired charge state, the controllable switch which is connected parallel with the pre-charging switch arrangement is also closed and the load is connected to the direct-current voltage source. The pre-charging switch can then be opened again.

In order to monitor the charge state of the capacitor, it is conventional to tap and evaluate a voltage of the capacitor across the opened controllable switch. This voltage can provide information relating to the charge state of the capacitor. This type of voltage measurement, however, requires complex isolation of the high-voltage lines from an electronic control system which may be present and which evaluates the voltage and produces control signals for switching the controllable switches. In addition, the galvanic separation between the two sides of the controllable switches is consequently not reliably ensured; in the prior art, auxiliary relays are often used for galvanic separation. Known solutions thus make the pre-charging switch arrangement complex and costly.

SUMMARY

An object of the invention, among others, is to provide a pre-charging switch arrangement which can reliably detect a charge state of the capacitor, ensure a high level of reliability, and additionally enable a compact structure of the pre-charging switch arrangement. The disclosed pre-charging switch arrangement has a pre-charging resistor, a pre-charging switch, and a voltage detection device connected to the pre-charging resistor and detecting a voltage across the pre-charging resistor.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a pre-charging switch arrangement. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
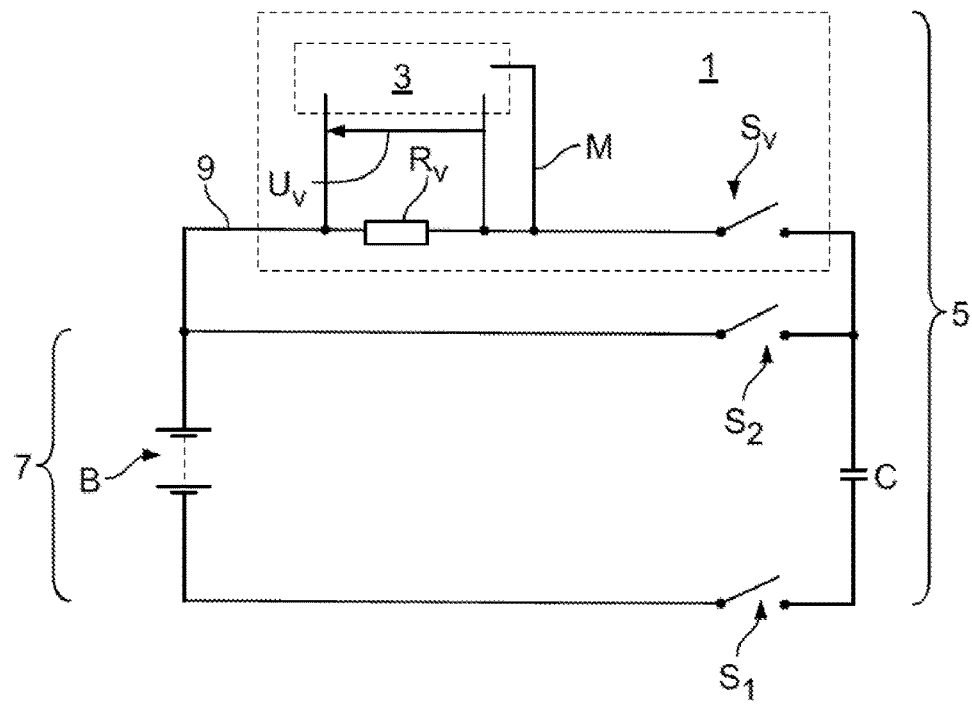
FIG. 1 is a schematic circuit diagram of a pre-charging switch arrangement according to the invention in a power supply arrangement according to the invention.

A pre-charging switch arrangement 1 according to the invention is shown generally in FIG. 1. The pre-charging switch arrangement 1 has a voltage detection device 3, a line section 9, a pre-charging switch SV, and a pre-charging resistor RV. The major components of the invention will now be described in greater detail.

As shown in FIG. 1, the pre-charging resistor RV and the pre-charging switch SV are arranged together in series on the line section 9. The pre-charging switch SV may be a contactor or a relay. In order to detect a voltage UV across the pre-charging resistor RV, the voltage detection device 3 is connected to the line section 9 upstream and downstream of the pre-charging resistor RV. The voltage detection device 3 may additionally be connected to a line M as a reference potential M at an additional location of the line section 9 between the pre-charging resistor RV and the pre-charging switch SV.

Figure 2:
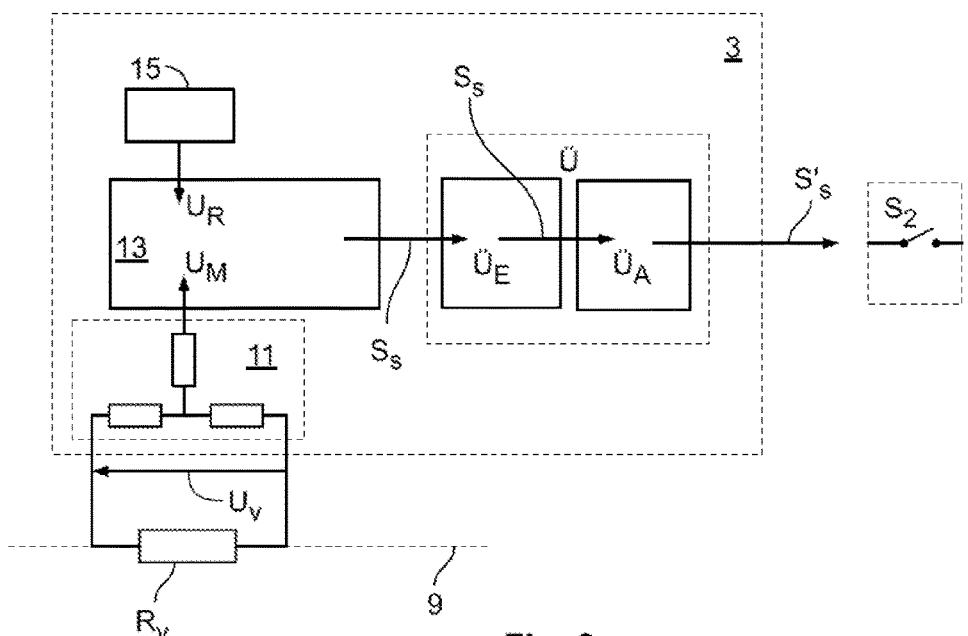
FIG. 2 is a schematic diagram of a voltage detection device of the pre-charging switch arrangement of FIG. 1.

The voltage detection device 3 is shown in greater detail in FIG. 2. The pre-charging voltage UV tapped at the pre-charging resistor RV is supplied to a first voltage divider 11 and from there a measurement voltage UM which is converted therefrom is supplied to a comparator 13. In the comparator 13, the measurement voltage UM is compared with a reference voltage UR produced by a direct-current voltage source 15. The direct-current voltage source 15 may in particular be a direct-current voltage converter.

The comparator 13 is connected at the output side to the input ÜE of a transmission unit Ü. A switching signal SS is directed from the comparator 13 to the input ÜE of the transmission unit Ü. The transmission unit Ü has an output ÜA which is galvanically separated from the input ÜE. The output ÜA of the transmission unit Ü transmits a switching signal S'S to the outer side of the voltage detection device 3.

The pre-charging switch arrangement 1 is shown as part of a power supply arrangement 5 in FIG. 1. The power supply arrangement 5 has a direct-current circuit 7 which is referred to below as a power supply circuit 7. The power supply circuit 7 connects a load, the capacitor C in FIG. 1, to a high direct-current voltage source B. The high direct-current voltage source B may in particular be a high-voltage battery. The power supply circuit 7 has a controllable first switch S1 and a controllable second switch S2 at both sides and both poles of the high direct-current voltage source B. If both controllable switches S1 and S2 are closed, the capacitor C is connected to the high direct-current voltage source B. The pre-charging switch arrangement 1 is connected parallel with the controllable second switch S2.

The voltage UV detected across the pre-charging resistor RV is used to evaluate the charge state of the capacitor C in the voltage detection device 3. The switching signal S's from the voltage detection device 3, as shown in FIG. 2, can be used to switch the controllable second switch S2. The switching signal S'S can be transmitted directly or via a suitable evaluation or electronic control system to a control input of the controllable second switch S2. The control input may, for example, be in abutment with a coil of the second switch S2 which is constructed as a contactor or relay.

A method according to the invention for connecting the load or capacitor C to the high direct-current voltage source B, for example, to the pre-charging switch arrangement 1 and the controllable second switch S2 at the positive side of the power supply circuit 7, will now be described in greater detail with reference to FIGS. 1 and 2.

The switches S1, S2 and SV begin open. There is no voltage at the capacitor C.

In a first step, the controllable first switch S1 is closed. The side of the capacitor C connected to the first switch S1 is then connected to a pole of the high direct-current voltage source B.

In order to pre-charge the capacitor C, the pre-charging switch SV is then closed. At the same time, the voltage detection device 3 can be provided with voltage. By closing the pre-charging switch SV, the capacitor C is connected to the high direct-current voltage source B via the pre-charging resistor RV. Via the pre-charging resistor RV, a charge current flows through the capacitor C, which is thereby charged. During the charging operation, the voltage UV across the pre-charging resistor RV is tapped from the voltage detection device 3. The voltage UV serves to establish the charge state of the capacitor C.

At the beginning of the charging operation, the full voltage of the high direct-current voltage source B is applied across the pre-charging resistor RV and the pre-charging voltage UV and the measurement voltage UM are greater than the reference voltage UR. The reference voltage UR is adjusted in accordance with the desired charge state of the capacitor C. The voltage UV across the resistor RV decreases as the charge state of the capacitor C increases. As soon as the voltage UM in the comparator 13 is below the reference voltage UR, the comparator transmits a switching signal SS to the transmission unit Ü.

The transmission unit Ü directs the switching signal SS indirectly or directly to a control input of the controllable second switch S2, as shown in FIG. 2. The controllable second switch S2 is thereby closed, whereby the power supply circuit 7 is closed. The load or the capacitor C thereof is then connected at all poles to the high direct-current voltage source B. If the controllable second switch S2 is closed, the pre-charging switch SV can be opened. Since the circuit is then interrupted over the line section 9, current no longer flows through the pre-charging switch arrangement 1, and the pre-charging switch arrangement 1 is in a powerless state.

Figure 3:
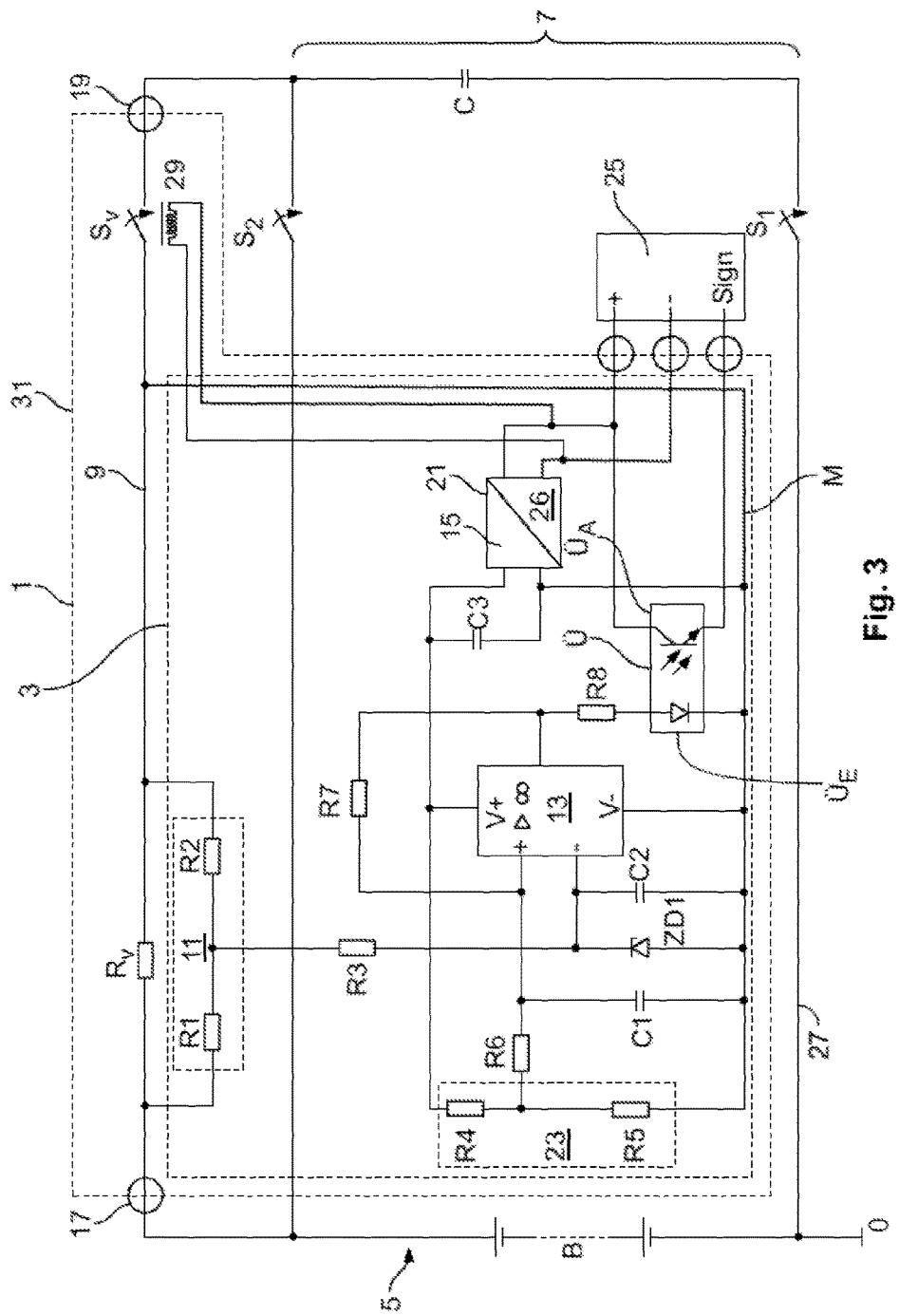
FIG. 3 is a circuit diagram of the pre-charging switch arrangement in the power supply arrangement of FIG. 1.

A circuit diagram of the pre-charging switch arrangement 1 of the power supplying arrangement 5 is shown in FIG. 3.

The pre-charging switch arrangement 1 is connected to the high-voltage potential of the power supply circuit 7 only by means of two high-voltage connections 17 and 19, one high voltage connection 17, 19 on each side of the controllable second switch S2. As already described above, the pre-charging switch arrangement 1 is switched into a powerless state by opening the pre-charging switch SV.

Across the pre-charging resistor RV, the pre-charging voltage UV is tapped using the first voltage divider 11, which is connected to an input side of the pre-charging resistor RV. The first voltage divider 11 is formed from first resistor R1 and second resistor R2. The pre-charging voltage UV is not identical to the charge voltage at the capacitor C, however, the pre-charging voltage UV can be used to determine the charge state of the capacitor C. The first voltage divider 11 provides the measurement voltage UM, which is supplied to the inverting input of the comparator 13.

The comparator 13 has supply connections V+, V−. The negative supply connection V− is in abutment with a line M of the voltage detection device 3. The line M is connected to the line section 9 between the voltage divider 11 and the pre-charging switch SV. Between the inverting input of the comparator 13 and the line M, a Zener diode ZD1 and parallel therewith a second device capacitor C2 are connected, limiting the voltage to a suitable level. The voltage is dependent on the comparator 13 used in a manner specific to the component. In order not to impair the function of the comparator 13, the value of the Zener voltage must be above the reference voltage at the non-inverting input. The Zener diode ZD1 serves to protect the inverting comparator input. The second device capacitor C2 serves to stabilize the inverting input. A third resistor R3 may be connected between the voltage divider 11 and the inverting input of the comparator 13.

The reference voltage UR is applied at the non-inverting input of the comparator 13. The reference voltage UR is provided by the direct-current voltage source 15. The direct-current voltage source 15 may be the output of a direct-current voltage converter 21. The negative output of the direct-current voltage converter 21 is connected to the line M.

A third device capacitor C3 is connected between a positive output of the direct-current voltage converter 21 and the line M. The capacitor C3 may serve to stabilize the output voltage of the direct-current voltage converter 21. The positive output of the direct-current voltage converter 21 is connected to the positive supply connection V+ of the comparator 13.

The reference voltage UR is provided by a second voltage divider 23 which is formed by a fourth resistor R4 and a fifth resistor R5, and which is connected between the positive output of the direct-current voltage converter 21 and the line M. The output of the second voltage divider 23 is connected to the non-inverting input of the comparator 13 via a sixth resistor R6. A first device capacitor C1 is connected between the resistor R6 and the non-inverting input of the comparator 13 and the line M, and may serve to stabilize the non-inverting input of the comparator 13.

The output of the comparator 13 is connected to the non-inverting input via a seventh resistor R7. A switching hysteresis can thereby be produced, whereby occurrences of incorrect switching can be prevented. The comparator 13 may constitute a Schmitt trigger together with the seventh resistor R7 and the sixth resistor R6.

The output of the comparator 13 is connected via an eighth resistor R8 to the input ÜE of the transmission unit Ü. In the embodiment shown, the transmission unit Ü is an optocoupler Ü and the input ÜE is a light diode ÜE. A light signal produced by the light diode ÜE can be received by the phototransistor ÜA, which constitutes the output ÜA of the transmission unit Ü, and be converted into an electrical signal S'S. The signal S'S is used to control the controllable switch S2 as described above.

The phototransistor ÜA can be connected to a low-voltage device 25. The low-voltage device 25 may belong to an electronic control system (not shown). The low-voltage device 25 has a positive connection, a negative connection and a signal line. The phototransistor ÜA may be connected to the positive line and to the signal line of the low-voltage device 25. At the input side, the direct-current voltage converter 21 may also be connected to the low-voltage device 25. The direct-current voltage converter 21 can be connected to the positive and the negative connection of the low-voltage device 25 and thereby obtain its operating voltage.

In an embodiment, inputs 26 of the direct-current voltage converter 21 are connected to a control input 29 of the pre-charging switch SV and the output or phototransistor ÜA of the transmission unit Ü. The same operating voltage of the low-voltage device 25 may then be used to operate both the direct-current voltage converter 21 and the control input 29, for example, a coil of the pre-charging switch SV. Due to the common input for the control input 29 of the pre-charging switch SV and for the direct-current voltage converter 21, the direct-current voltage converter 21 is active when the pre-charging switch SV is switched on.

The pre-charging switch arrangement 1 is compact, having only the two high-voltage connections 17, 19 and the three connections to the low-voltage device 25. The low-voltage device 25 may be disposed outside the pre-charging switch arrangement 1, as shown in FIG. 3. The pre-charging switch arrangement 1 is not connected at any location in a conductive manner to the negative branch 27 of the power supply circuit 7. The elements of the pre-charging switch arrangement 1 form a component group 31 which may be disposed in a common housing (not shown).

The devices according to the invention and the method are described above with the pre-charging switch arrangement 1 and the controllable second switch S2, for example, at the positive side of a high-current circuit 7. The arrangement of the devices on the negative side and the implementation of the method with the devices according to the invention at the negative side is, however, also possible. In this instance, the controllable second switch S2 would also be located at the negative side of the circuit 7, while the controllable first switch S1 would be arranged at the positive side.

Advantageously, according to the pre-charging switch arrangement 1 of the present invention, the voltage to be detected can be tapped at the pre-charging resistor RV and not at one of the controllable switches S1, S2. Since the voltage to be measured is not tapped at both sides of one of the controllable switches S1, S2, the two sides of the controllable switches S1, S2 are each completely galvanically separated when the switches S1, S2 are opened, eliminating the need to use an auxiliary relay. The pre-charging switch arrangement 1 therefore allows the charging of the capacitor C and the detection of the voltage to be carried out with increased reliability without requiring complex isolation from the circuit 7. Furthermore, the pre-charging switch arrangement 1 requires only two high-voltage connections 17 and 19 to the circuit 7, and the control input 29 of the pre-charging switch SV is directly connected to the input of the direct-current voltage converter 21, achieving a compact and simple construction. Additionally, since the output ÜA of the transmission unit Ü is galvanically separated from the input ÜE, an electronic control system of a vehicle incorporating the pre-charging switch arrangement 1 can be operated separately from the high direct-current circuit 7, which significantly increases reliability.

What is claimed is:

1. A pre-charging switch arrangement for charging a capacitor of a direct-current circuit, comprising:
   a pre-charging resistor;
   a pre-charging switch; and
   a voltage detection device connected to the pre-charging resistor and detecting a voltage across the pre-charging resistor, the voltage detection device has a comparator comparing the voltage across the pre-charging resistor with a reference voltage from a direct-current voltage source, an output of the comparator is connected to an input of a transmission unit and an output of the transmission unit is galvanically separated from the input of the transmission unit.

2. The pre-charging switch arrangement of claim 1, wherein the voltage detection device has a first voltage divider connected to an input side of the pre-charging resistor.

3. The pre-charging switch arrangement of claim 2, further comprising a reference potential line connected to the voltage detection device and connected between the pre-charging resistor and the pre-charging switch.

4. The pre-charging switch arrangement of claim 3, wherein the first voltage divider has a first resistor and a second resistor, a third resistor is connected between the first voltage divider and an input of the comparator.

5. The pre-charging switch arrangement of claim 4, further comprising a Zener diode connected between the input of the comparator and the reference potential line.

6. The pre-charging switch arrangement of claim 1, wherein the direct-current voltage source is a direct-current voltage converter.

7. The pre-charging switch arrangement of claim 6, wherein the direct-current voltage source is connected to the comparator by a second voltage divider.

8. The pre-charging switch arrangement of claim 7, wherein a control input of the pre-charging switch is connected to an input of the direct-current voltage converter.

9. The pre-charging switch arrangement of claim 6, wherein the output of the transmission unit is connected to the input of the direct-current voltage converter.

10. The pre-charging switch arrangement of claim 9, wherein a supply line of the comparator, an output of the direct-current voltage converter, the input of the transmission unit, the first voltage divider, and the second voltage divider have a common reference potential connected to a line section connecting the pre-charging resistor to the pre-charging switch.

11. The pre-charging switch arrangement of claim 10, wherein the first voltage divider, the second voltage divider, the pre-charging resistor, the pre-charging switch, the comparator, the transmission unit, and the direct-current voltage converter form a component group disposed in a housing.

12. The pre-charging switch arrangement of claim 1, wherein the transmission unit is an optocoupler, the input of the transmission unit is a light diode and the output of the transmission unit is a phototransistor receiving a light signal produced by the light diode.

13. The pre-charging switch arrangement of claim 1, further comprising a resistor connected between an output of the comparator and the input of the transmission unit.

14. A power supplying arrangement, comprising:
a direct-current circuit connecting a high direct-current voltage source to a capacitor and having a controllable first switch and controllable second switch each arranged between a pole of the high direct-current voltage source and the capacitor; and
a pre-charging switch arrangement connected in parallel with the controllable second switch and having a pre-charging resistor, a pre-charging switch, and a voltage detection device connected to the pre-charging resistor detecting a voltage across the pre-charging resistor, the voltage detection device has a comparator comparing the voltage across the pre-charging resistor with a reference voltage from a direct-current voltage source, an output of the comparator is connected to an input of a transmission unit and an output of the transmission unit is galvanically separated from the input of the transmission unit.

15. The power supplying arrangement of claim 14, wherein the pre-charging switch arrangement is connected to the direct-current circuit only by two high-voltage connections, one high voltage connection on each side of the controllable second switch.

16. A method for connecting a load to a high direct-current voltage source, comprising:
detecting a voltage across a pre-charging resistor arranged between the high current-current voltage source and the load; and
connecting the load to the high direct-current voltage source depending on the voltage across the pre-charging resistor, a direct-current circuit connects the high direct-current voltage source to the load and has a controllable first switch and a controllable second switch each arranged between a pole of the high direct-current voltage source and the load.

17. The method for connecting a load to a high direct-current voltage source of claim 16, wherein a pre-charging switch arrangement connected in parallel with the controllable second switch has the pre-charging resistor, a pre-charging switch, and a voltage detection device connected to the pre-charging resistor detecting the voltage across the pre-charging resistor.

18. The method for connecting a load to a high direct-current voltage source of claim 17, wherein, when the voltage across the pre-charging resistor is below a reference voltage, the pre-charging switch is opened and the pre-charging switch arrangement is switched into a powerless state.

* * * * *